J. N. NEWSOM.
VALVE FOR PNEUMATIC TIRES.
APPLICATION FILED APR. 10, 1913.
1,129,585.
Patented Feb. 23, 1915.
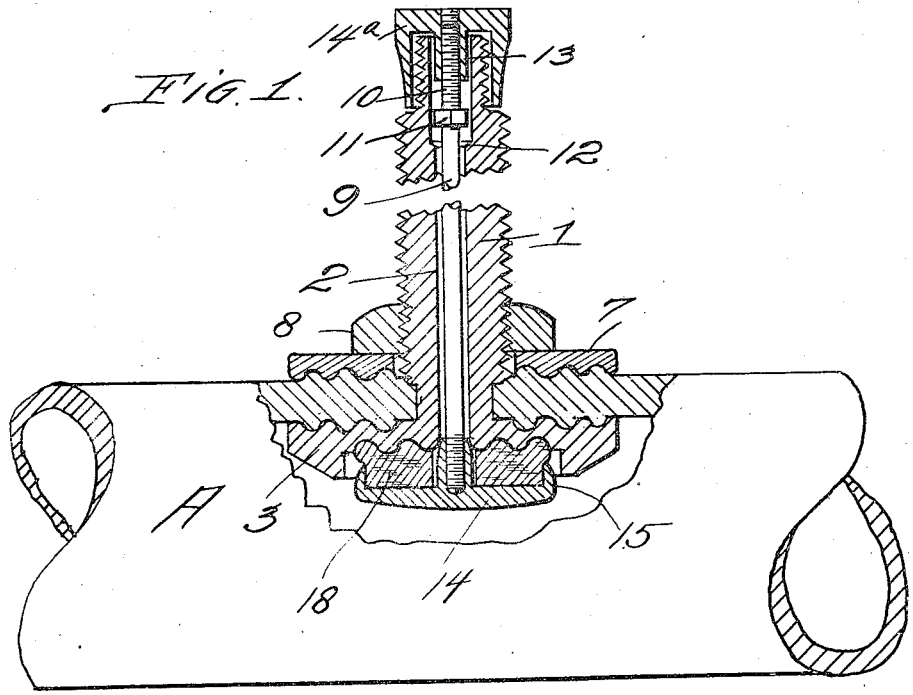
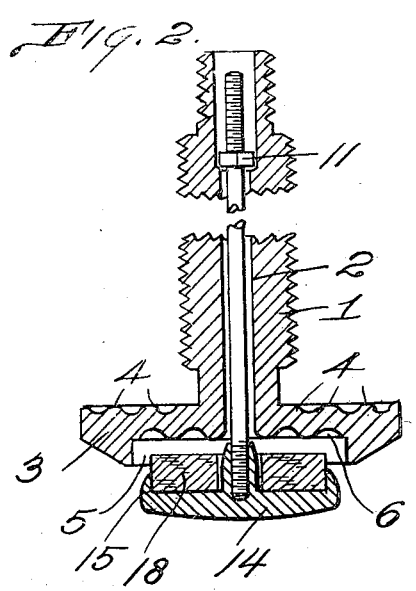
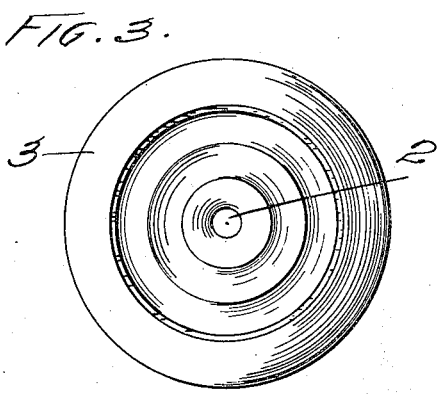
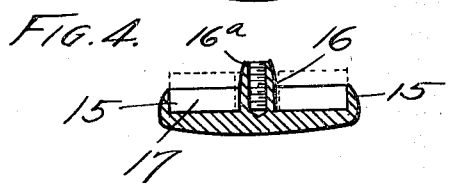
ATTEST.
W. M. George.
Ella Dealy.
INVENTOR:—
Joseph N. Newsom

UNITED STATES PATENT OFFICE.

JOSEPH N. NEWSOM, OF ST. LOUIS, MISSOURI, ASSIGNOR, BY DIRECT AND MESNE ASSIGNMENTS, TO ST. LOUIS PNEUMATIC VALVE COMPANY, OF ST. LOUIS, MISSOURI, A CORPORATION OF MISSOURI.

VALVE FOR PNEUMATIC TIRES.

1,129,585.  Specification of Letters Patent. Patented Feb. 23, 1915.

Application filed April 10, 1913. Serial No. 760,184.

*To all whom it may concern:*

Be it known that I, JOSEPH N. NEWSOM, a citizen of the United States, residing at St. Louis, State of Missouri, have invented a new and useful Valve for Pneumatic Tires, of which the following is a specification.

My invention relates to valves particularly intended for use on pneumatic tires, the principal objects of my invention being to construct a comparatively simple inexpensive valve which, when closed, is perfectly air tight; to construct a valve of comparatively few parts and devoid of all springs and other delicate parts, which are liable to become easily broken and unserviceable; to construct a valve having a seat formed so that the gasket or flexible facing of the valve will not tend to adhere thereto; and to construct a valve which can be readily removed from the rim of a wheel without injury to any parts of the valve or said rim.

In valves of the type to which my invention relates the disk forming the body of the valve proper usually carries a gasket or facing of elastic or flexible material, such as rubber or analogous material, and where this gasket bears upon a flat seat which has approximately the same area as the face of the valve against which the gasket is positioned, said gasket tends to stick or adhere to its stem when the body of the valve is moved away from said stem, and as a result the valve soon becomes inoperative.

Under ordinary conditions it is necessary to unseat a valve in order to inflate the tire, or in the case of repairs, and I propose to construct a simple inexpensive valve devoid of springs and like delicate parts, which valve, when closed, is practically air tight and the face or gasket of which valve will tend to follow the disk or body of the valve when said valve is unseated, rather than to adhere to the valve stem.

To the above purposes my invention consists in certain novel features of construction and arrangement of parts, hereinafter more fully described, claimed and shown in the accompanying drawings, in which:

Figure 1 is a sectional view taken through the center of a valve of my improved construction, the same being applied to an inflatable tire. Fig. 2 is a sectional view similar to Fig. 1 and showing the valve opened or unseated. Fig. 3 is a face of the disk on the lower end of the valve housing and on which disk the valve seat is formed. Fig. 4 is a sectional view through the center of the disk which forms the body of the valve proper.

Referring by numerals to the accompanying drawings 1 designates the valve housing which is preferably of cylindrical form and provided with a centrally arranged port 2. Formed integral with the lower end of this housing is a disk 3, the top face of which is provided with a series of annular ribs 4, which are adapted to engage a portion of the inflatable tire A when the housing is applied thereto. The underside of the disk 3 is provided wth a shallow recess 5 and formed in the face of this recess is a series of annular grooves 6 which are concentric with the port 2.

When the valve housing thus constructed is applied to an inflatable tube a disk or washer 7 is located on the housing 1 on the exterior of the inflatable tube 5, said washer being held in position by a nut 8, which latter is positioned on the threaded exterior of the housing 1.

The underside of the washer 7 is preferably provided with a series of annular grooves corresponding to the grooves 4 in the top of the disk 3.

A valve stem 9 in the form of a rod extends through the port 2 and the upper end of this rod is threaded as designated by 10 in order to receive a nut 11, which latter is adapted to engage against a shoulder 12 formed in the upper end of the port 2 to prevent the rod from dropping through the housing. The threaded upper end of the stem 9 receives a threaded nipple 13 which latter is formed on a cylindrical nut 14ᵃ, said nut being loosely mounted on the upper end of the housing 1.

Fixed in any suitable manner to the lower end of the stem 9 is a disk 14 which forms the body of the valve proper and formed on the edge of this disk is an upwardly projecting flange 15. This disk 14 is of such size that the flange 15 occupies a position directly opposite the central portion of the outer one of the annular grooves 6, which latter are formed in the underside of the disk 3.

Formed integral with the center of the disk 14 is an upwardly projecting lug 16 which receives the lower end of the stem 9 and the annular recess 17 between this lug and the flange 15 is occupied by a circular disk or body of rubber 18 which forms the gasket or packing disk of the valve. The upper end of the lug 16 is slightly rounded or beveled as designated by 16ª and when the valve is drawn upward to bring the gasket against its stem this upper end of the lug fits snugly within the lower end of the port 2 which is formed through the valve housing.

When the tire is inflated and the valve is in use the nut or cap 14ª on the upper end of the valve housing is rotated thereby drawing the valve seat and parts carried thereby upwardly by reason of the engagement of the threaded upper end 10 of said valve seat in the nipple 13. This movement draws the disk 14 and gasket 18 upward and the upper portion or face of said gasket which engages the valve seat comprises the annular grooves 6 and as the valve is tightly closed by the continued manipulation of the nut 14ª the gasket is compressed so that it enters and completely fills the annular grooves 6 as shown in Fig. 1. Thus the entire upper portion of the gasket practically becomes distorted or loses its normal shape and as said gasket is squeezed tightly between the disks 3 and 14 a very tight joint is maintained which prevents the escape of air through the valve housing. When the valve is opened by loosening the nut 14 the gasket will follow the disk 14 for the reason that the lower portion of said gasket is engaged on three sides by the upper face of said disk, the inner face of the flange 15, and the outer face of the lug 16, and also by reason of the fact that the upper portion of said gasket which was heretofore compressed into the annular grooves 6 will tend to return to its normal shape, thereby drawing away from the stem formed by said annular grooves. Such construction prevents the packing disk or gasket from sticking to the valve seat and also provides a practically air tight joint between the valve and its housing.

A valve of my improved construction is comparatively simple, can be easily and cheaply manufactured, is devoid of springs and like parts which are liable to get out of order easily, and by my improved construction of valve and valve seat the gasket or packing disk carried by the valve is prevented from adhering to the seat when the valve is opened after being tightly closed for a considerable period of time.

It will be readily understood that minor changes in the size, form and construction of the various parts of my improved valve can be made and substituted for those herein shown and described, without departing from the spirit of my invention, the scope of which is set forth in the appended claim.

I claim:

In a valve of the class described, a tubular member, a disk fixed to the lower end thereof, in the underside of which disk is formed a recess, the bottom of which is provided with a series of annular concentric grooves, a stem passing through the tubular member, a disk carried by the lower end of said stem, a flange on the edge of said disk, a compressible member located on the disk within said flange, a lug on the center of said disk, the upper end of which lug is tapered and adapted to enter the lower end of the passage way through the tubular member when the valve is closed, means on the valve stem for preventing its dropping through the tubular member, and a cap seated on the upper end of said valve stem.

In testimony whereof I hereunto affix my signature in the presence of two witnesses, this 2nd day of April, 1913.

JOSEPH N. NEWSOM.

Witnesses:
  ALBERT L. LEWIS,
  W. M. GEORGE.